March 12, 1963  G. C. WILSON ET AL  3,080,769
TRANSMISSION CONTROL

Filed April 17, 1961  3 Sheets-Sheet 1

INVENTORS
George C. Wilson &
BY William J. Le Duc

A. M. Heiter
ATTORNEY

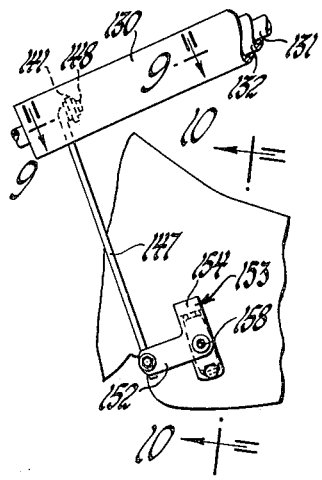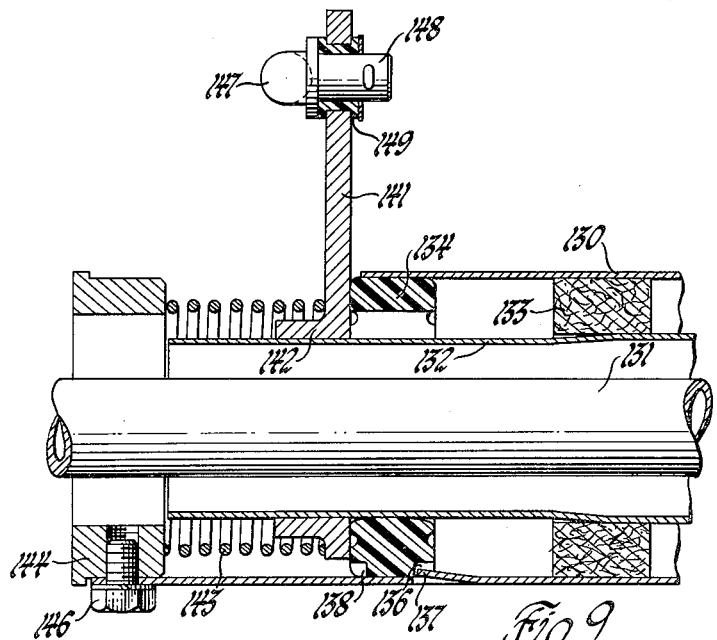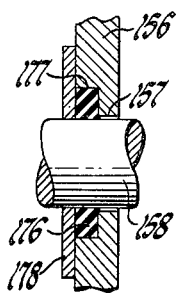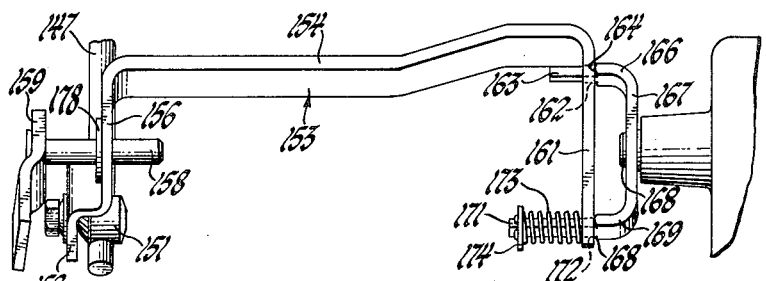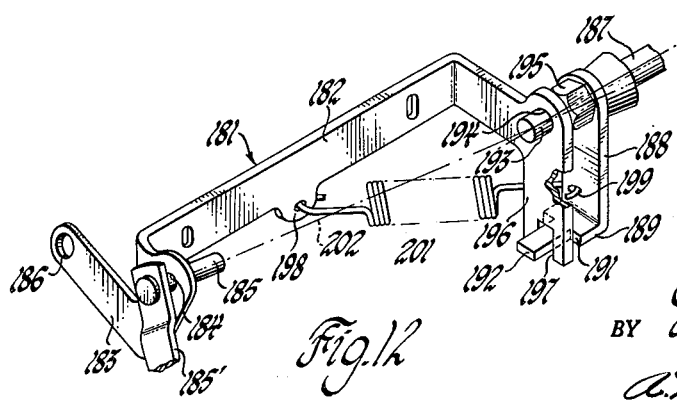
INVENTORS
George C. Wilson &
William J. LeDuc
BY
A.M. Heiter
ATTORNEY

United States Patent Office 3,080,769
Patented Mar. 12, 1963

3,080,769
TRANSMISSION CONTROL
George C. Wilson, Flint, and William J. Le Duc, Lapeer, Mich., assignors to General Motors Corporation, Detroit, Mich., a corporation of Delaware
Filed Apr. 17, 1961, Ser. No. 103,649
17 Claims. (Cl. 74—473)

The invention relates to a control linkage and particularly a transmission control linkage mounted on a steering column of a vehicle to control a transmission.

The transmission control linkage is generally mounted on the steering column and has a hand lever adjacent the steering wheel connected to a control tube, mounted concentrically on the steering column. The hand lever, when moved in the normal H path, reciprocates the control tube in response to selecting movement and rotates the control tube in response to shifting movement. The reciprocal movement of the control tube selectively clutches the control tube to one or another of a pair of shift control levers. The shift control levers are rotatably mounted on the control tube. A pair of keys are attached to the control tube so that when one key is engaged in the keyway of one control lever the other key will be on the outboard side of the other control lever. This arrangement makes it possible to use continuous thrust bearing members between the shift levers. This key and lever arrangement as compared to the use of a single key between the levers reverses the location of the first reverse and the second-third shift lever with the normal shift pattern for the hand lever so that in this installation the rods connecting the shift levers to the transmission need not be crossed. It will also be noted that in this arrangement the shift levers, the thrust washers and the keys may be of identical construction. Also in our arrangement, the keys with a tapered leading edge may be more readily used and provide better contact with the keyway since the taper need only be applied to one end of the key. In forming the shift levers, the free end of the bearing flange which is most difficult to form need not be so accurately formed since it merely contacts a nylon thrust washer in a stationary position and the entrance portion of the keyway which requires more accurate forming and better durability is in a location where it is more easily formed to obtain these qualities. The portion of the key having parallel sides is, when in the operative position, in alignment with the main portion of the shift control lever.

There are also provided a lever and shaft assembly formed of simple stampings to provide a lever, a shaft and a universal joint connection to the transmission shift operating lever.

An object of the invention is to provide in a control linkage having a control tube and a pair of control levers rotatably mounted about the control tube, a pair of keys fixed to the control tube and arranged to enter keyways in the shift control levers from the outboard side of the control levers.

Another object of the invention is to provide in a transmission control linkage having a control tube and a pair of shift control levers rotatably mounted about the control tube, a pair of thrust washers fixed to the facing surfaces of the control levers and a pair of keys fixed to the control tube in spaced relation and arranged to selectively enter from the outboard side keyways in the shift control levers.

Another object of the invention is to provide in a control system, a shaft and lever assembly consisting of a pair of levers connected by a strap element acting as a shaft with one lever connected to a control rod and having means to pivotally mount the lever on a support and the other lever and controlled lever having axially slidable interengaging tongue and slot formations to provide a universal joint connection.

These and other objects of the invention will be more apparent from the following description and drawings of the preferred embodiments of the invention.

FIGURE 3 is a sectional view of FIGURE 1 on the line 3—3.

FIGURE 4 is a sectional view of FIGURE 3 on the line 4—4.

FIGURE 5 is a sectional view of FIGURE 3 on the line 5—5.

FIGURE 6 is a sectional view of FIGURE 3 on the line 6—6.

FIGURE 7 is a perspective view of a thrust washer.

FIGURE 8 is a partial elevational view of a modification.

FIGURE 9 is a sectional view of FIGURE 8 on the line 9—9.

FIGURE 10 is a sectional view of FIGURE 8 on the line 10—10.

FIGURE 11 is a detail view of a vibration damper bearing construction.

FIGURE 12 shows a modified strap shaft and universal joint construction in perspective.

Figure 1:
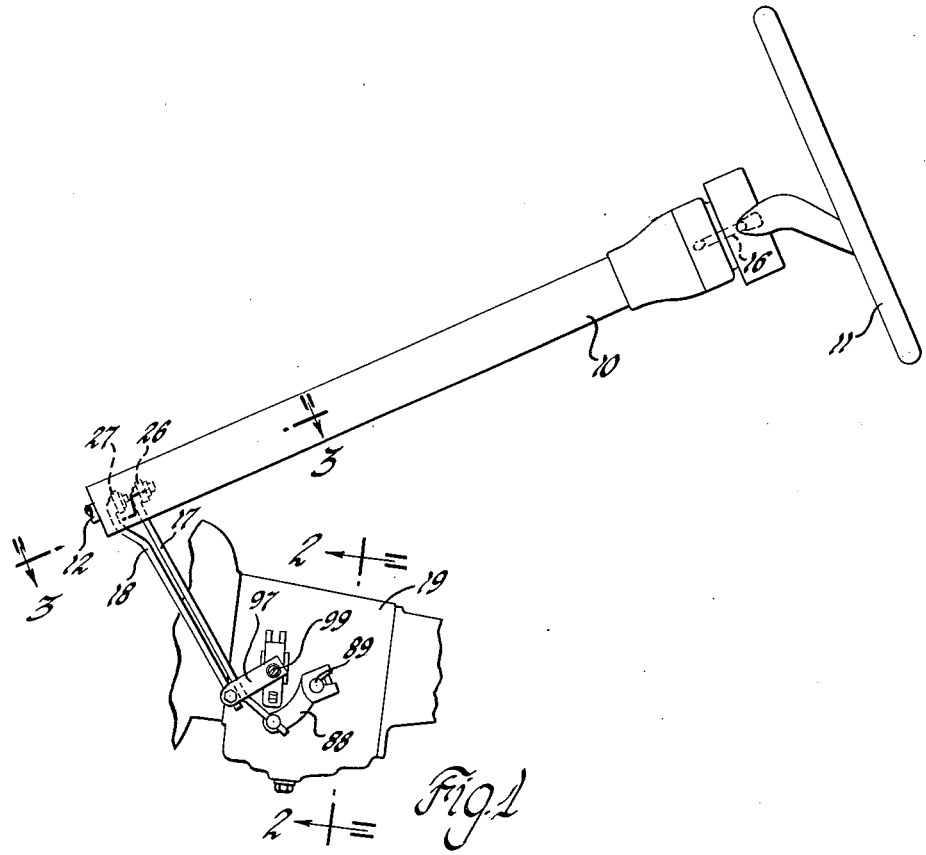
FIGURE 1 is an elevational view of the transmission control linkage assembly.

The invention is illustrated in a transmission control arrangement mounted on a steering column 10 having a conventional steering wheel 11 operating a steering shaft 12 which is suitably supported by bearings, not shown, within the steering column 10. The steering column 10 is conventionally mounted on the vehicle frame, not shown. A control tube 14 is mounted concentrically between the steering shaft 12 and the steering column 10 and is operated to impart rotary and reciprocating control movement to the control tube by a gearshift lever 16, mounted at the upper end of the steering column and connected to the control tube, as shown, for example in FIGURE 5 of the Primeau Patent 2,924,988. The gearshift lever 16 is moved in the conventional H path and connected to the control tube so that selecting movement reciprocates the control tube and shifting movement rotates the control tube. At the lower end of the steering column the control tube is selectively connected to a first reverse lever 26 or a second-third lever 27 to actuate through rods 17 and 18 and the linkage described below the transmission controls within the transmission 19.

Referring to FIGURE 3 showing in detail the lower end of the control tube 14 located within the steering column 10. The control tube 14 is rotatably supported by an annular bearing 21 within the steering column 10. The bearing 21 is held against upward and rotary movement by tongues 22 cut and pressed inward from the wall of the steering column 10, and fitting into recesses 23 in the bearing ring 21. The lower end of the steering column 10 has a large recess 24 to permit rotary movement of the first reverse lever 26 and the second-third lever 27.

The first reverse lever 26 has a cylindrical bearing portion 28 substantially wider in an axial direction than the lever 26 mounted on and in bearing engagement with the control tube 14. The lever 27 has a similar bearing portion 29 acting as a bearing to support the lever 27 on control tube 14 for relative rotary and sliding movement. The lever 26 has a keyway 31 extending completely through the bearing portion of the lever. The lever 27 has a similar keyway 32 extending completely through the bearing portion. A key 33 has a portion projecting through an aperture 34 in the control tube 14 for cooperation with the slot 31 and has a cylindrical flange portion 36 contacting the interior surface of control tube 14 and welded thereto to secure the key in position. The leading edge 37 of the key 33 is tapered to a point to insure entry into slot 31 even though there may be some misalignment. The lower key 39 similarly projects through an aperture or recess 41 in the control tube 14 and has a partial cylindrical flange 42 engaging the interior surface of the control tube and welded thereto. The leading edge 43 of key 39 is also tapered to a point to facilitate entry into slot 32 even though some misalignment exists. A pair of annular nylon washers 46 and 47 are located between the lever bearing portion 28 and 29. The washer 46 has a lug 48 projecting into keyway 31 to cause washer 46 to rotate with lever 26. The washer 47 has a lug 49 projecting into keyway 32 to cause washer 47 to rotate with lever 27, thus the wear between levers 26 and 27, due to their relative rotary movement, occurs between the meeting faces of washers 46 and 47 which are preferably nylon to limit wear. In order to assemble the device, the washer 47 has a slot 51 so that the washer may pass over the key 39, and is then rotated into position with the projection 49 in slot 32. The washer 46 has a similar slot, not shown, for the same purpose.

At the lower end of the control tube 10 a bearing ring 56 is secured to the steering column 10 with bolts 57 which extend through angular slots 57' to permit rotation of ring 56 for axial adjustment. The bearing ring 56 engages the lower side surface of lever 27 to axially position the levers and washers between bearing 56 and bearing 21. As shown in FIGURE 5, a slot 58 extends through the bearing ring 56 over a portion of the inner circumference to provide a space in which the key 39 may rotate when the key 33 engages the lever 26. The recess for slot 58 has a greater circumferential extent than the rotary movement of key 39 so that there is clearance at both ends of the slot regardless of which rotary position the ring 56 is positioned for axial adjustment in the angular slots 57'. The ring 56 also has recessed portions 59, 61 and 62 to reduce the weight of the metal. These recessed portions do not extend completely through the ring 56 so that the ring has a continuous face except for the slot 58 engaging in thrust bearing relation the adjacent face of the annular portion of lever 27. The bearing ring 21 is formed symmetrically having duplicate recesses 23 and 23' on opposite sides and duplicate annular grooves 66 and 67 on opposite sides so that it will not be necessary to assemble the ring with one side facing in a particular direction. A coil spring 68 surrounding the control tube 14 engages the groove 66 and an abutment washer 69, which bears against a shoulder 71 formed by a tapered portion of the control tube. A fiber seal 72 is also placed on the tube 14 and engages the tapered portion and is held in place by the abutment washer 69.

As shown in FIGURES 1 and 3, the first reverse lever 26 is connected to rod 17 and the second third lever 27 is connected to rod 18. The rod 17 has a laterally extending pin portion 76 which passes through a rubber grommet 77 having annular side ribs engaging the sides of lever 26. Pin portion 76 has a shoulder 78 engaging one side of the grommet and a washer 79 engaging the other side and is held in place by a cotter key 81. The rod 18 has a similar laterally projecting pin portion 82 passing through a grommet 83 to pivotally connect rod 18 to the lever 27.

A rod 17 extends into an aperture of a bolt-clamp 84 which grips the rod 17 against the washer 86 when the nut 87 is tightened, to pivotally connect the rod 17 to the lever 88 secured to the first reverse transmission control shaft 89.

Figure 2:
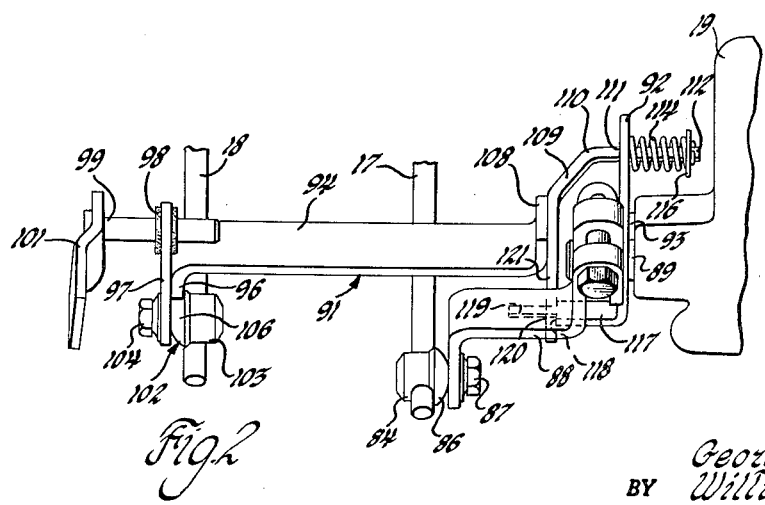
FIGURE 2 is a sectional view of FIGURE 1 on the line 2—2.

As best shown in FIGURE 2, the rod 18 is connected by the stamped lever and shaft assembly 91 to the lever 92 which is drivingly connected to the second third transmission control shaft 93. The assembly 91 has a shaft portion 94 made of sheet metal with an end portion 96 welded to a lever 97 having an aperture at one end in which the rubber grommet 98 is placed to pivotally mount the assembly on a pivot pin 99 fixed to a bracket 101 secured to the vehicle frame, not shown. The lever 97 is pivotally connected to the rod 18 by bolt clamp 102 having an apertured head 103 which received the rod 18. When the nut 104 is tightened it draws the rod against the washer 106 to pivotally connect the rod 18 to lever 97. The other end of the shaft portion 94 has a flange 108 to which is spot-welded a lever arm 109 which has an axial portion 110 having a shoulder 111 and a tongue 112 extending beyond the shoulder and through aperture in the straight arm of lever 92. A spring 114 engaging an abutment 116 fixed to the end of the tongue 112 resiliently holds the lever arm 109 in the position shown with the shoulder 111 engaging lever 92. The other end of the arm 92 has an axially projecting portion 117 having a shoulder 118 and a tongue 119 extending therebeyond and through an aperture, or elongated aperture or slotted portion 120 in the end 121 of lever 109.

A modified transmission control mechanism employed to provide a plurality of positions of one lever of the type employed to operate automatic transmissions is illustrated in FIGURE 8. This transmission control mechanism is also mounted on a steering column 130 having a steering shaft 131 conventionally mounted for rotary movement therein. A control tube 132 is similarly rotated by a hand lever at the upper end of the steering column. This rotary movement controls the transmission. Reciprocating movement of hand lever 16 does not reciprocate the control tube 132 but functions in cooperation with a stop plate (not shown) in a known manner to limit rotary movement of the control tube. A fiber seal 133 is located between the steering column 130 and control tube 132. A bearing 134 fitting within the steering column 130 has a plurality of recesses 136 into which the displaced tongues 137 fit to axially locate and prevent relative rotation of the bearing 134 with respect to the column 130. It will be noted that the bearing 134 is made symmetrical so that either face may be inserted first. The control lever 141 has an annular bearing portion 142 engaging the control 132 and welded thereto. The bearing portion 142 has a radial annular face engaging the bearing 134. A spring 143 surrounds the control tube and engages lever 141 to hold it in the upper position. The hand lever is moved upwardly to disengage the stop plate to permit movement to certain positions, as the park position, as is well known in the art. An abutment ring 144 suitably secured by screws 146 to the steering column 130 provides an abutment for spring 143. The lever 141 is pivotally connected to a control rod 147 by means of a lateral projection 148 extending through a grommet 149 similar to the above described connection between rod 17 and lever 26.

The rod 147 is pivotally connected by a clamping bolt 151 to the lever 152 of the stamped one-piece shaft and lever assembly 153. The assembly 153 has a central shaft portion 154 having an integral portion bent transversely thereto to provide the lever 152. Lever 152 has an aperture 157 spaced from the shaft portion 154 to receive a pin 158 suitably secured to a bracket 159 supported on the vehicle frame, not shown. The other end of the shaft portion 154 is similarly integrally bent transversely thereto to provide a lever 161 having an aperture 162 adjacent shaft portion 154 to receive a tongue 163 which extends beyond the shoulder 164 of an axial portion 166 of lever 167 which is secured to the transmission control shaft 168. The lever 168 has at its opposite end an axial portion 169 having a shoulder 168 engaging the face of lever 161 and a tongue 171 extending beyond the shoulder portion 168 which extends through a slot, or aperture, 172 in the free end of lever 161. A spring 173 engaging an abutment 174 of the free end of tongue 171 engages lever 161 to resiliently hold it in the position shown against shoulder 168. The lever 152 is resiliently mounted on the pin 158 by means of a plastic or rubber bearing washer 176 which fits in an annular recess 177 surrounding the aperture for pin 158 and is retained in place by a steel washer 178 secured to lever 152. The aperture in the lever 156 has a larger diameter than the pin 158 so that a plastic or rubber bearing is provided but on deterioration of the plastic or rubber bearing 176 the bearing will not completely fail.

A modified stamped shaft and lever assembly 181 is illustrated in FIGURE 12. This assembly has a stamped shaft portion 182 having an integrally formed transverse arm 183 which has an aperture 184 adjacent the shaft portion 182 which receives a rubber grommet or bearing similar to bearing member 176 and is suitably supported on a pin 185 supported on the frame 185'. An extended portion of lever 183 has a suitable aperture 186 to receive a pivot clamp for connection to a control rod. The transmission control shaft 187 has attached thereto a lever 188 having an axial extension 189 formed with a shoulder 191 having a tongue extension 192. Shaft 187 has a smaller diameter extending portion 193 extending beyond the lever 188 to provide a pivotal mounting which fits in the aperture 194 in the integral lever portion 196 formed at the transmission end of shaft portion 182. The lever 188 is preferably keyed to shaft portion 193 and held by a nut 195 against the shoulder between shaft 187 and the small diameter extension 193. The lower end of lever 196 has a slot 197 to receive the tongue 192. An integrally formed spring anchor 198 formed as an integral apertured extension of shaft portion 182 receives one hook of a coil spring 201 while the other hook is hooked in an aperture 199 in lever 188 to resiliently hold the tongue 192 within the slot 197. The pin 185 is not coaxial with shaft 187 but is located forward of the shaft to avoid interference of the linkage with other vehicle parts. This is done by aligning the pin 185, as shown, by the pin centerline 202 which passes through the center of aperture 194 or the center of shaft extension 193 at the center of lever 196. The bearing surface of aperture 194 is rounded and nut 195 has a spherical face contacting lever 196 to accommodate the off-center pivotal movement of lever assembly 181.

In the control mechanism shown in FIGURES 1–6, the spring 68 normally biases the control tube 14 to the upper position shown in which the key 39 engages the slot 32 in the second third shift lever 27. Rotary movement of the control tube 14 will rotate the lever 27 and the connected transmission control mechanism for shifting to second or third ratios. For shifting to either the first or reverse position, control tube 14 is moved downwardly by the selecting movement to select the first-reverse shift lever 26. Before such downward movement can be accomplished, the first-reverse lever 26 must be in the neutral position or else the key 33 could not enter the slot 31. After downward selecting movement, key 33 is located in the recess 31 of lever 26 while the key 39 is removed from the recessed lever 27. Then on rotary movement of the control tube 14, the lever 26 rotates to either the first or reverse position. In forming the shift levers of this type it is difficult to obtain accurate dimensional conditions in good quality metal on the radial face at the free edge of the bearing portion. The other bearing surface being a side of lever 26 is not difficult to form and thus provides a more satisfactory bearing surface. With this in mind, this construction provides for bearing engagement between the bearing 21 and the more easily formed and better prepared surface 26' of the lever 26. The other thrust surface 28' which is more difficult to form and thus less likely to be of good quality, is provided with a separate bearing member 46 made of nylon or other plastic material which may be more accurately and cheaply formed. The lug 48 on the washer 46 engages slot 31 to insure that there is no relative rotation between the washer 46 and the bearing surface 28'. A similar washer 47 similarly engages the end face of bearing portion 29 and has a lug 48 engaging slot 32 to prevent relative rotation between washer 47 and bearing portion 29 but only relative rotation between the washers. The lugs 48 and 49 on the washers 46 and 47 respectively act as stops to limit movement of keys 33 and 39 into the slots and thus limit the reciprocal movement of the control tube 14. The nylon lugs provide a silent damped stop. The lug portion of the washers may be made softer for increased damping. The height or length of the lugs extending into the slots in the levers thus limits the amount of control tube and hand lever reciprocation. It will be noted that FIGURE 3 is an offset section indicating that the slots 31—32 in the levers 26—27 are offset about 30° or sufficiently so that a solid portion of the bearing portion of one lever engages the washers opposite the slot in the other lever bearing portion to reduce deflection in the thrust washers when they are bumped by the keys during "cross over" or selecting shifting movement to increase washer durability and provide a solid feel to the shift.

The lever and shaft assembly 91 provides a simple construction formed of simple stamped parts permitting relative motion between the transmission 19 which moves with the engine and the steering column mechanism 10 which is fixed to the vehicle frame without causing movement of the hand lever or interfering with proper action of the linkage. The lever 97 is pivoted on the pin 99 fixed to the vehicle frame and does not move when the other end of the shaft part 94 moves with the transmission. Movement of the transmission in the direction coaxially with pin 99 will of course merely move the grommet 98 axially of pin 99 and does not affect the linkage. The lever connection between shaft lever 94 and the transmission control shaft is formed by a universal joint consisting of levers 109 and 92. This simple lever construction consisting of two L-shaped levers, each connected to the other by tongue and aperture connection, and resiliently held in position, provides a simple inexpensive universal connection.

The modification as shown in FIGURES 8–10 provides a single control movement in a plurality of positions, particularly useful for automatic transmissions. The control lever 132 is merely rotated to rotate the lever 141 and to reciprocate the rod 147. FIGURE 10 also shows a simple one-piece shaft and lever assembly which may be formed by stamping. In this construction a straight piece of sheet metal is bent to provide a lever at each end. It will be appreciated that this assembly also permits relative movement between the transmission frame in the same manner as the strap assembly 91 and that the further simplified tongue and slot arrangement provides a universal joint to accommodate relative movement of the transmission and vehicle frame. FIGURE 12 shows a further simplification of this basic arrangement reducing the number of parts and assembly operations. It also provides for offset pin and shaft locations. It should be noted that the radius from transmission shaft 187 to strap shaft part 182 is larger than the radius from pivot pin 185 to the strap shaft part 182 so this part is substantially coaxial with transmission shaft 187. The strap shaft part 182 and the lever 183, in the blank form before they are bent at right angles to each other, are adjacent and parallel to each other so the assembly 181 may be stamped from a small blank. It will be appreciated that the shaft and lever assemblies 91, 153 and 181 may be used to connect either rods 17, 18 or 147 to the transmission shift shafts.

The above described preferred embodiments are illustrative of the invention which may be modified within the scope of the appended claims.

We claim:

1. In a transmission control linkage, a steering column, a transmission control tube mounted on said steering column for relative rotary and axial movement, a pair of control levers each having a bearing portion rotatably mounting each lever on said control tube, an axial keyway in the bearing portion of each control lever, and a pair of keys fixed to said control tube spaced apart so that when one key is in one lever the other key is beyond the other lever and when said other key is in said other lever said one key is beyond said one lever.

2. In a transmission control linkage, a steering column, a transmission control tube mounted on said steering column for relative rotary and axial movement, a pair of control levers each having a bearing portion rotatably mounting each lever on said control tube with the bearing portions having facing ends, an axial keyway in the bearing portion of each control lever, a thrust washer on each adjacent facing end of the bearing portions having a stop dog fitting into the keyway in each lever to prevent relative rotation between each lever and its associated thrust washer to provide relative rotation only between the thrust washers, and key means fixed to said control selectively engaging the keyway in each lever.

3. In a transmission control linkage, a steering column, a transmission control tube mounted on said steering column for relative rotary and axial movement, a pair of control levers each having a bearing portion rotatably mounting each lever on said control tube with the bearing portions having facing ends, an axial keyway in the bearing portion of each control lever, a thrust washer on each adjacent facing end of the bearing portions having a stop dog fitting into the keyway in each lever to prevent relative rotation between each lever and its associated thrust washer to provide relative rotation only between the thrust washers, and a pair of keys fixed to said control tube spaced apart so that when one key is in one lever the other key is beyond the other lever and when said other key is in said other lever said one key is beyond said one lever.

4. In a transmission control linkage, a steering column, a transmission control tube mounted on said steering column for relative rotary and axial movement, a pair of control levers each having a bearing portion extending from one side of the lever rotatably mounting each lever on said control tube with the bearing portions extending toward each other and having facing ends, an axial keyway in the bearing portion of each control lever, a thrust washer on each adjacent facing end of the bearing portions having a stop dog fitting into the keyway in each lever to prevent relative rotation between each lever and its associated thrust washer to provide relative rotation only between the thrust washers, and a pair of keys fixed to said control tube spaced apart so that when one key is in one lever the other key is beyond the other lever and when said other key is in said other lever said one key is beyond said one lever.

5. In a transmission control linkage, a steering column having an aperture therein, a transmission control tube mounted concentrically within said steering column for relative rotary and axial movement, a pair of control levers mounted at opposite sides of the aperture and each having a bearing portion extending from one side of the lever rotatably mounting each lever on said control tube with the bearing portions extending toward each other and having facing ends, an axial keyway in the bearing portion of each control lever, a thrust washer on each adjacent facing end of the bearing portions having a stop dog fitting into the keyway in each lever to prevent relative rotation between each lever and its associated thrust washer to provide relative rotation only between the thrust washers, and a pair of keys fixed to said control tube spaced apart so that when one key is in one lever the other key is beyond the other lever and when said other key is in said other lever said one key is beyond said one lever.

6. In a control linkage, a support, a control member rotatably and reciprocally mounted on said support for rotation about the axis of said member and reciprocation along the axis of said member, a pair of control levers each having one side facing the other lever and another side and including means mounting said control levers on said control member for rotary movement relative to said control member and keyway means, a pair of thrust washers, a thrust washer engaging said one side of each lever and having means cooperating with said keyway means to cause a thrust washer to rotate with each lever, and means on said support to hold said levers in a fixed longitudinal position relative to said axis of said control member with said thrust washers in engagement with each other.

7. In a control linkage, a support, a control member rotatably and reciprocally mounted on said support for rotation about the axis of said member and reciprocation along the axis of said member, a pair of control levers each having one side facing the other lever and another side and including means mounting said control levers on said control member for rotary movement relative to said control member and keyway means, means on said support to hold said levers in a fixed longitudinal position relative to said axis of said control member, and a pair of keys fixed to said control member in spaced apart relation with one key engaged in said keyway means of one lever and the other key disengaged from the keyway means of the other lever in one position and on movement to another position said other key engaging said other keyway means of said other lever and said one key disengaging said one keyway means of said one lever.

8. In a control linkage, a support, a control member rotatably and reciprocally mounted on said support for rotation about the axis of said member and reciprocation along the axis of said member, a pair of control levers each having one side facing the other lever and another side and including means mounting said control levers on said control member for rotary movement relative to said control member and keyway means, a pair of thrust washers, a thrust washer engaging said one side of each lever and having means cooperating with said keyway means to cause a thrust washer to rotate with each lever, means on said support to hold said levers in a fixed longitudinal position relative to said axis of said control member with said thrust washers in engagement with each other, and a pair of keys fixed to said control member in spaced apart relation with one key engaged in said keyway means of one lever and the other key disengaged from the keyway means of the other lever in one position and on movement to another position said other key engaging said other keyway means of said other lever and said one key disengaging said one keyway means of said one lever.

9. In a control linkage, a support, a control member rotatably and reciprocally mounted on said support for rotation about the axis of said member and reciprocation along the axis of said member, a pair of control levers each having one side facing the other lever and another side and including means mounting said control levers on said control member for rotary movement relative to said control member and a straight axial keyway, a pair of plastic thrust washers, a thrust washer engaging said one side of each lever and having locating means located in and blocking said keyway means to cause a thrust washer to rotate with each lever, means on said support to hold said levers in a fixed longitudinal position relative to said axis of said control member with said thrust washers in engagement with each other, and a pair of keys fixed to said control member in spaced apart relation with one key engaged in said keyway of one lever and the other key disengaged from the keyway of the other lever in one position and on movement to another position said other key engaging said other keyway means of said other lever and said one key disengaging said one keyway means of said one lever and said locating means of said thrust washers limiting movement of said keys in said keyways.

10. In a control linkage, a transmission having a pair of control shafts, support means having first and second support portions, a control member rotatably and reciprocally mounted on said first support portion for rotation about the axis of said member and reciprocation along the axis of said member, a pair of control levers each having one side facing the other lever and another side and including means mounting said control levers on said control member for rotary movement relative to said control member and keyway means, a pair of thrust washers, a thrust washer engaging said one side of each lever and having means cooperating with said keyway means to cause a thrust washer to rotate with each lever, means on said first support portion to hold said levers in a fixed longitudinal position relative to said axis of said control member with said thrust washers in engagement with each other, a pair of keys fixed to said control member in spaced apart relation with one key engaged in said keyway means of one lever and the other key disengaged from the keyway means of the other lever in one position and on movement to another position said other key engaging said other keyway means of said other lever and said one key disengaging said one keyway means of said one lever, a rod connecting one control lever to one transmission control shaft, an input lever pivotally mounted on said second support portion in approximate axial alignment with the other transmission control shaft, an output lever universally connected to said other transmission control shaft, a sheet metal strut connecting said input and output levers, and a rod connecting said other control lever and said input lever.

11. In a transmission control linkage, support means having first and second support portions, said first support portion having a pivot shaft, a control member rotatably mounted on said second support portion, a control lever operatively connected to said control member, a transmission having a shift control shaft substantially coaxial with said pivot shaft, a shift lever fixed to said shift control shaft having a connector part located parallel to the axis of said shift control shaft, said connector part having a shoulder and a tongue extending beyond said shoulder, a shaft and lever assembly having a central strut portion and an input lever and an output lever, said assembly being pivotally mounted on said first support portion, and said assembly being pivotally mounted on said shift control shaft and having an opening to receive said tongue to provide a driving connection between said output lever and said shift lever.

12. In a transmission control linkage, support means having first and second support portions, said first support portion having a pivot shaft, a control member rotatably mounted on said second support portion, a control lever operatively connected to said control member, a transmission having a shift control shaft substantially coaxial with said pivot shaft, a shift lever fixed to said shift control shaft having a connector part located parallel to the axis of said shift control shaft, said connector part having a shoulder and a tongue extending beyond said shoulder, a sheet metal shaft and lever assembly having a central strut portion and input and output levers at right angles to said strut portion, said input lever being pivotally mounted on said first support portion, said output lever being pivotally mounted with respect to said shift control shaft and having an opening to receive said tongue to provide a driving connection between said output lever and said shift lever, spring means connected between said shift lever and said assembly to hold said tongue in said opening to provide a universal connection, and actuating means connecting said control lever to said input lever.

13. In a transmission control linkage, a support having a pivot shaft, a transmission having shift control means including a shift control shaft substantially coaxial with said pivot shaft and a shift lever fixed to said shift control shaft having a connector part located parallel to the axis of said shift control shaft, said connector part having a shoulder and a tongue extending beyond said shoulder, a sheet metal shaft and lever assembly having a central strut portion and terminal parts at right angles forming an input lever and an output lever, said input lever having an aperture receiving said pivot shaft to pivotally mount said assembly on said support, said output lever having means to pivotally mount said assembly on said shift control means including an opening to receive said tongue to provide a driving connection between said output lever and said shift lever, spring means connected between said shift lever and said assembly to hold said tongue in said opening to provide a universal connection, and actuating means connected to said input lever.

14. The invention defined in claim 13 and said shaft and lever assembly including separate input and output levers and a connecting strut welded to said levers.

15. In a transmission control linkage, a support having a pivot shaft, a transmission having shift control means including a shift control shaft substantially coaxial with said pivot shaft and a shift lever fixed to said shift control shaft having a connector part located parallel to the axis of said shift control shaft, said connector part having a shoulder and a tongue extending beyond said shoulder, a one-piece sheet metal shaft and lever assembly having a central strut portion having terminal portions bent at right angles forming an input lever and an output lever, said input lever having an aperture receiving said pivot shaft to pivotally mount said assembly on said support, said output lever having means to pivotally mount said assembly on said shift control means including an opening to receive said tongue to provide a driving connection between said output lever and said shift lever, spring means connected between said shift lever and said assembly to hold said tongue in said opening to provide a universal connection, and actuating means connected to said input lever.

16. In a transmission control linkage, a support having a pivot shaft, a transmission having a shift control shaft substantially coaxial with said pivot shaft, a shift lever fixed to said shift control shaft having a connector part located parallel to the axis of said shift control shaft, said connector part having a shoulder and a tongue extending beyond said shoulder, a one-piece sheet metal shaft and lever assembly having a central strut portion having terminal portions bent at right angles forming an input lever and an output lever, said input lever having an aperture receiving said pivot shaft to pivotally mount said assembly on said support, said output lever having an aperture receiving said shift control shaft to pivotally mount said assembly on said shift control shaft and an opening to receive said tongue to provide a driving connection between said output lever and said shift lever, spring means connected between said shift lever and said assembly to hold said tongue in said opening to provide a universal connection, and actuating means connected to said input lever.

17. In a transmission control linkage, a support having a pivot shaft, a transmission having a shift control shaft substantially coaxial with said pivot shaft, a shift lever fixed to said shift control shaft having a connector part located parallel to the axis of said shift control shaft, said connected part having a shoulder and a tongue extending beyond said shoulder, a one-piece sheet metal shaft and lever assembly having a central strut portion having terminal portions bent at right angles forming an input lever and an output lever, said input lever having an aperture receiving said pivot shaft to pivotally mount said assembly on said support, said output lever having an aperture receiving said shift control shaft to pivotally mount said assembly on said shift control shaft and an opening to receive said tongue to provide a driving connection between said output lever and said shift lever, spring means connected between the end of said tongue on said shift lever and said assembly to hold said tongue in said opening to provide a universal connection, and actuating means connected to said input lever.

References Cited in the file of this patent

UNITED STATES PATENTS

| | | |
|---|---|---|
| 1,425,227 | Woodward | Aug. 8, 1922 |
| 2,631,467 | Lincoln et al. | Mar. 17, 1953 |
| 2,924,988 | Primeau | Feb. 16, 1960 |